United States Patent
Clendinning et al.

Patent Number: 4,857,625
Date of Patent: Aug. 15, 1989

[54] AROMATIC AMORPHOUS THERMOPLASTIC TERPOLYMERS

[75] Inventors: Robert A. Clendinning, New Providence; Louis M. Maresca, Belle Mead; Markus Matzner, Edison; Thomas H. Schwab, North Brunswick, all of N.J.

[73] Assignee: Amoco Corporation, Chicago, Ill.

[21] Appl. No.: 35,259

[22] Filed: Apr. 2, 1987

Related U.S. Application Data

[63] Continuation of Ser. No. 854,683, Apr. 18, 1986, which is a continuation of Ser. No. 452,454, Dec. 23, 1982, abandoned.

[51] Int. Cl.$^4$ .............................................. C08L 27/18
[52] U.S. Cl. ................................... 528/171; 528/172; 528/174; 525/534
[58] Field of Search ............... 528/171, 172, 174, 534

[56] References Cited

U.S. PATENT DOCUMENTS

| | | | |
|---|---|---|---|
| 4,108,837 | 8/1978 | Johnson et al. | 528/126 |
| 4,175,175 | 11/1979 | Johnson et al. | 528/125 |
| 4,256,862 | 3/1981 | Binsack et al. | 525/534 |
| 4,358,569 | 11/1982 | Quinn et al. | 525/534 |

Primary Examiner—John Kight
Assistant Examiner—M. L. Moore
Attorney, Agent, or Firm—Donald M. Papuga; William H. Magidson; Ralph C. Medhurst

[57] ABSTRACT

Described herein are amorphous thermoplastic terpolymers containing units of the formula:

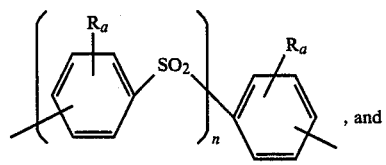

, and

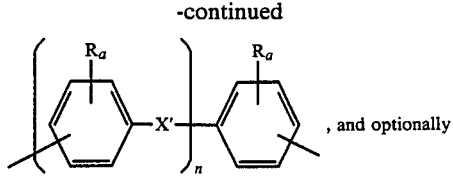

, and optionally

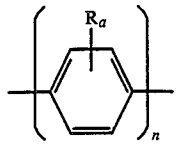

wherein R is independently hydrogen, $C_1$ to $C_6$ alkyl, or $C_4$ to $C_8$ cycloalkyl, X' is independently

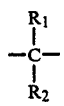

wherein $R_1$ and $R_2$ are independently hydrogen or $C_1$ to $C_9$ alkyl;

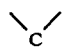

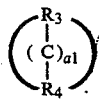

wherein $R_3$ and $R_4$ are independently hydrogen or $C_1$ to $C_8$ alkyl and $a_1$ is an integer of 2 to 7; —S—, —O—, or

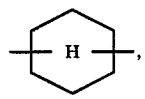

a is an integer of 0 to 4 and n is independently an integer of 1 to 3. The units are attached to each other by an —O— bond. These polymers have an excellent combination of mechanical properties. They display high notched izod impact values, high heat distortion temperatures and excellent environmental stress crack resistance.

3 Claims, No Drawings

AROMATIC AMORPHOUS THERMOPLASTIC TERPOLYMERS

This is a continuation of application Ser. No. 854,683, filed 18 Apr. 1986, which is a continuation of Ser. No. 452,454, filed on 23 Dec. 1982, no abandoned.

BACKGROUND OF THE INVENTION

This invention is directed to amorphous thermoplastic terpolymers containing sulfone groups.

Polyarylene polyethers are described in, for example, U.S. Pat. No. 4,175,175. This patent describes a polymer which has the following structure:

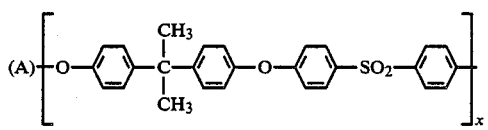

This polymer is commercially available and is a tough, rigid, high strength thermoplastic which maintains its properties over a wide temperature range from −150° F. to above 300° F. Polymer (A) has a good combination of mechanical properties and exellent electrical properties. Said polymer is highly resistant to mineral acids, alkali and salt solutions but will be attacked by environments such as polar organic solvents. Thus, there is a need to improve the environmental resistance, particularly the environmental stress crack resistance of Polymer (A) so that it can be used in applications where it will be exposed to an aggressive solvent environment.

Attempts have been made to develop polymers which have the good properties of polymer (A) and additionally, improved environmental stress crack resistance.

The following polymer (B):

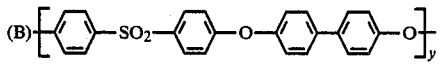

has a good balance of mechanical properties, and possesses higher notched impact strength and heat deflection temperature than polymer (A). Additionally, polymer (B) has improved stress crack resistance. However, polymer (B) is prepared from 4,4'-dichlorodiphenyl sulfone and 4,4'-biphenol. The 4,4'-biphenol is difficult and costly to prepare and does not readily lend itself to commercialization.

Accordingly, a need still exists for a polymer which has the good combination of mechanical properties of polymer (A) and improved environmental stress crack resistance.

A novel class of amorphous thermoplastic terpolymers has been discovered which can be easily prepared are inexpensive and thus lend themselves to commercialization. They possess an excellent combination of mechanical properties. Additionally, these novel terpolymers display high notched izod impact values, high heat distortion temperatures and have excellent environmental stress crack resistance.

THE INVENTION

This invention is directed to novel amorphous thermoplastic terpolymers.

The terpolymers of this invention contain units of the formula:

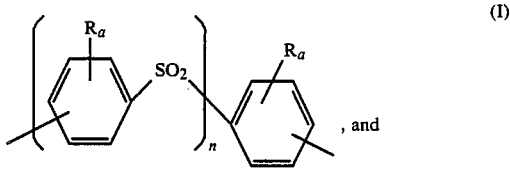
, and

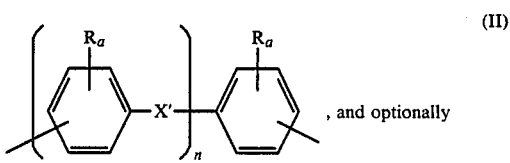
, and optionally

wherein R is independently hydrogen, $C_1$ to $C_6$ alkyl, or $C_4$ to $C_8$ cycloalkyl, X' is independently

wherein $R_1$ and $R_2$ are independently hydrogen or $C_1$ to $C_9$ alkyl;

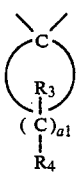

wherein $R_3$ and $R_4$ are independently hydrogen or $C_1$ to $C_8$ alkyl, and $a_1$ is an integer of 3 to 8; —S—, —O—, or

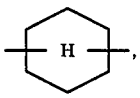

a is an integer of 0 to 4 and n is independently an integer of 1 to 3 and wherein the ratio of unit (I) to the sum of units (II) and (III) is greater than 1. The units are attached to each other by an —O— bond.

The preferred terpolymer of this invention contains units of the formula:

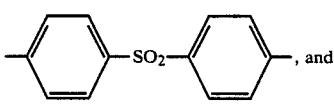
, and

-continued

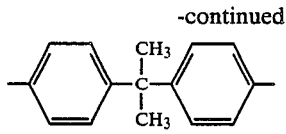

These units are attached to each other by an —O— bond.

The terpolymers may be random or may have an ordered structure.

The terpolymers of this invention have a reduced viscosity of from about 0.4 to greater than about 2.5, as measured in N-methylpyrolidone, or other suitable solvent at 25° C.

The terpolymers of this invention are prepared by reacting the monomers represented by the following formulae:

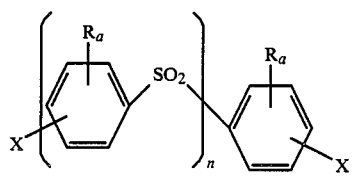 (IV)

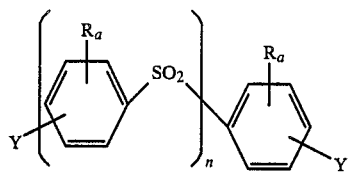 (V)

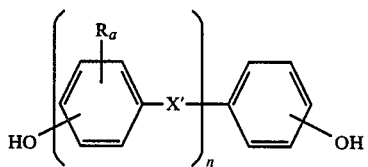 (VI)

and optionally 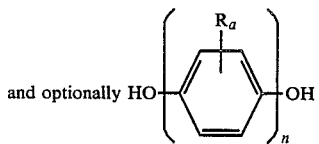 (VII)

wherein R, a, X' and n are as previously defined, and X and Y are independently selected from Cl, Br, F, $NO_2$ or OH and at least 50 percent of the Y's are OH.

The ratio of the concentration of OH groups to Cl, Br, F and/or $NO_2$ groups used to form the polymer is from about 0.90 to about 1.10, preferably from about 0.98 to about 1.02.

The monomers, represented by formulas IV, (V) and VII, include the following:
2,2-bis(4-hydroxyphenyl)propane,
bis(4-hydroxyphenyl)methane,
4,4'-dihydroxydiphenyl sulfide,
4,4'-dihydroxydiphenyl ether,
4,4'-dihydroxydiphenyl sulfone,
2,4'-dihydroxydiphenyl sulfone,
4,4'-dichlorodiphenyl sulfone,
4,4'-dinitrodiphenyl sulfone,
4-chloro-4'-hydroxydiphenyl sulfone, 4,4'-biphenol, hydroquinone, and the like.

The preferred monomers include 2,2-bis(4-hydroxyphenyl)propane, 4,4'-dichlorodiphenyl sulfone and 4,4'-dihydroxydiphenyl sulfone or 4 chloro-4'-hydroxydiphenyl sulfone and optionally hydroquinone or 4,4'-biphenol.

The polymers of this invention are prepared by contacting substantially equimolar amounts of the hydroxy containing compounds (depicted in formulas (IV) to (VII) supra) and halo and/or nitro containing compounds (depicted in formula (IV) and (V) supra) with from about 0.5 to about 1.0 mole of an alkali metal carbonate per mole of hydroxyl group in a solvent mixture comprising a solvent which forms an azeotrope with water in order to maintain the reaction medium at substantially anhydrous conditions during the polymerization.

The temperature of the reaction mixture is kept at from about 120° to about 180° C., for about 1 to about 5 hours and then raised and kept at from about 200° to about 250° C., preferably from about 210° to about 230° C., for about 1 to 10 hours.

The reaction is carried out in an inert atmosphere, e.g., nitrogen, at atmospheric pressure, although higher or lower pressures may also be used.

The polymer is then recovered by conventional techniques such as coagulation, solvent evaporation, and the like.

The solvent mixture comprises a solvent which forms an azeotrope with water and a polar aprotic solvent. The solvent which forms an azeotrope with water includes an aromatic hydrocarbon such as benzene, toluene, xylene, ethylbenzene, chlorobenzene, and the like.

The polar aprotic solvents employed in this invention are those generally known in the art for the manufacture of polyarylether sulfones and include sulfur containing solvents such as those of the formula:

$$R_1-S(O)_b-R_1$$

in which each $R_1$ represents a monovalent lower hydrocarbon group free of aliphatic unsaturation, which preferably contains less than about 8 carbon atoms or when connected together represents a divalent alkylene group with b being an integer from 1 to 2 inclusive. Thus, in all of these solvents all oxygens and two carbon atoms are bonded to the sulfur atom. Contemplated for use in this invention are such solvents as those having the formula:

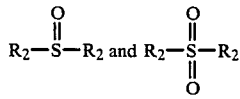

where the $R_2$ groups are independently lower alkyl, such as methyl, ethyl, propyl, butyl, and like groups, and aryl groups such as phenyl and alkylphenyl groups such as the tolyl group, as well as those where the $R_2$ groups are interconnected as in a divalent alkylene bridge such as:

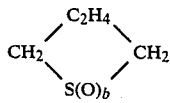

in tetrahydrothiophene oxides and dioxides. Specifically, these solvents include dimethylsulfoxide, dimethylsulfone, diphenylsulfone, diethylsulfoxide, diethylsulfone, diisopropylsulfone, tetrahydrothiophene 1,1-dioxide (commonly called tetramethylene sulfone or sulfolane) and tetrahydrothiophene-1 monoxide.

Additionally, nitrogen containing solvents may be used. These include dimethyl acetamide, dimethyl formamide and N-methylpyrolidone.

The azeotrope forming solvent and polar aprotic solvent are used in a weight ratio of from about 10:1 to about 1:1, preferably from about 7:1 to about 5:1.

In the reaction, the hydroxy containing compound is slowly converted, in situ, to the alkali salt thereof by reacting with the alkali metal carbonate. The alkali metal carbonate is preferably potassium carbonate. Mixtures of carbonates such as potassium and sodium carbonate may also be used.

Water is continuously removed from the reaction mass as an azeotrope with the azeotrope forming solvent so that substantially anhydrous conditions are maintained during the polymerization.

It is essential that the reaction medium be maintained substantially anhydrous during the polycondensation. While amounts of water up to about one percent can be tolerated, and are somewhat beneficial when employed with fluorinated dihalobenzenoid compounds, amounts of water substantially greater than this are desirably avoided as the reaction of water with the halo and/or nitro compound leads to formation of phenolic species and only low molecular weight products are secured. Consequently, in order to secure the high polymers, the system should be substantially anhydrous, and preferably contain less than 0.5 percent by weight water during the reaction.

Preferably, after the desired molecular weight has been attained, the polymer is treated with an activated aromatic halide or an aliphatic halide such as methyl chloride or benzyl chloride, and the like. Such treatment of the polymer converts the terminal hydroxyl groups into ether groups which stabilize the polymer. The polymer so treated has good melt and oxidative stability.

The terpolymers of this invention may be blended with one or more compatible thermoplastic polymers such as polyarylates, poly(aryl ethers), polyetherimides, polyesters, aromatic polycarbonates including polyestercarbonates, polyurethanes, polyhydroxyethers.

EXAMPLES

The following examples serve to give specific illustrations of the practice of this invention but they are not intended in any way to limit the scope of this invention. In these examples, all parts and percentages are on a weight basis unless otherwise specified.

Example 1

A four neck 2 liter round bottom flask was equipped with a mechanical stirrer, thermocouple, addition funnel, dry nitrogen inlet, and a vacuum jacketed Vigreux column with a distillation trap and a condenser. Into the flask were charged 172.30 g. (0.60 moles) of 4,4'-dichlorodiphenyl sulfone, 120.18 g. (0.48 moles) of 4,4'-dihydroxydiphenyl sulfone, 27.39 g. (0.12 moles) of 4,4'-bisphenol A, 87.16 g. (0.618 moles) of 98% pure potassium carbonate, 195 ml. of chlorobenzene, and 514 ml. of sulfolane. The mixture was purged with nitrogen for 30 minutes and then heated to 160° C. where it was maintained for about 2.5 hours. The temperature was then raised to 220° C. and held there for about 6 hours. Methyl chloride was used to terminate the polymerization after 4.23 g. of potassium carbonate was added. The polymer was recovered by dilution with chlorobenzene, filtration to remove salts, and coagulation into methanol. It was washed with warm water and finally with methanol before drying in a vacuum oven at about 120° C. The polymer had a reduced viscosity of 0.71 as measured in N-methylpyrolidinone (0.2 g/100 ml) at 25° C. The polymer had a repeating unit of the following formula:

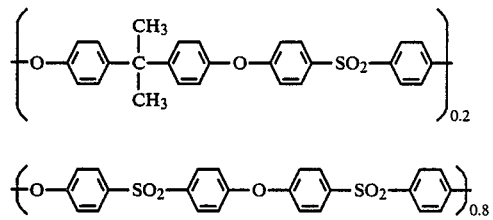

Example 2

A four neck 2 liter round bottom flask was equipped with a mechanical stirrer, thermocouple, addition funnel, dry nitrogen inlet and a vacuum jacketed Vigreux column with a distillation trap and a condenser. Into the flask were charged 172.70 g. (0.60 moles) of 4,4'-dichlorodiphenyl sulfone, 135.15 g. (0.54 moles) of 4,4'-dihydroxydiphenyl sulfone, 13,70 g. (0.06 moles) of 4,4'-bisphenol A, 85.47 g. (0.606 moles) of 98.0% pure potassium carbonate, 195 ml. of chlorobenzene, and 514 ml. of sulfolane. The mixture was purged with nitrogen for 30 minutes and then heated to 220° C. and maintained there for about 7 hours. The reaction was terminated by reaction with methyl chloride after the addition of 4.23 g. of potassium carbonate. The polymer was recovered by dilution with chlorobenzene, filtration to remove salts, and extrusion through a vented extruder to recover pelletized product. The material had a reduced viscosity of 0.53 as measured in N-methylpyrolidinone (0.2 g/100 ml) at 25° C. The polymer had a repeating unit of the following formula:

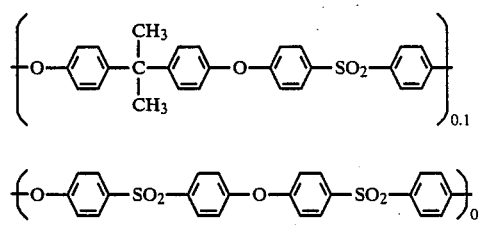

The polymer prepared in Example 1 was compression molded at about 300° C. into ASTM test bars and tested for the following properties: Tensile strength and modulus according to ASTM D-638; yield strength according to ASTM D-790; elongation at break according to ASTM D-638; pendulum impact strength according to ASTM D-1822. The glass transition temperature (Tg) of the polymer was obtained by a dynamic mechanical method using a torsion pendulum as described in L. E. Nielsen, Mechanical Properties of Polymers, Van Nostrand-Reinhold, Princeton, N.J. Also, the reduced viscosity of the polymer is shown.

Controls A and B were also tested as described to determine their physical properties. The reduced viscosity of the Controls was measured in methylene chloride at 25° C. (0.2 gm/100 ml).

Control A is a polymer of the following formula:

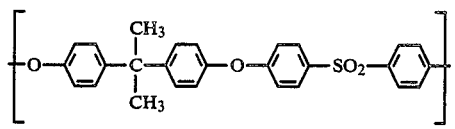

and Control B has the following formula:

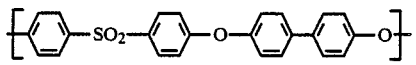

The results are shown in Table I.

TABLE I

| Example | Tensile Modulis (psi) | Tensile Strength (psi) | Yield Strength (psi) | Elongation (%) | Pendulum Impact (Ft. lbs/in.³) | Tg (°C.) | Reduced Viscosity (dl/g) |
|---|---|---|---|---|---|---|---|
| Control A | 370,000 | 10,000 | 10,000 | 50 | 150 | 185 | 0.50 |
| Control B | 321,000 | 10,600 | 10,600 | 78 | 300 | 215 | 0.55 |
| 1 | 289,000 | 11,300 | 11,300 | 22 | 153 | 210 | 0.53 |

What is claimed is:

1. A process for the production of an amorphous thermoplastic polymer containing units of formula:

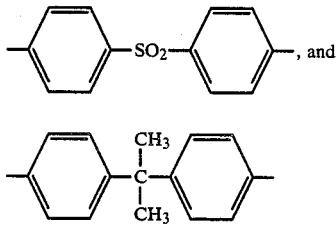

wherein the ratio of unit (I) to unit (II) is greater than (I); said units (I) and (II) being attached to each other by an —O— bond, comprising reacting under substantially anhydrous conditions bisphenol A, dichlorodiphenyl sulfone dihydroxydiphenyl sulfone, in an aprotic solvent in the presence of alkali metal carbonate, wherein the ratio of the concentration of OH groups to halo groups is from about 0.90 to about 1.10.

2. A process for the production of an amorphous thermoplastic polymer containing units of formula:

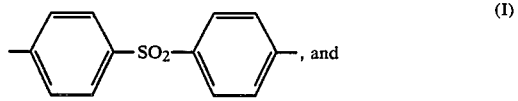

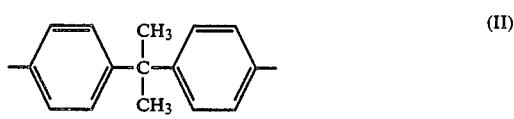

wherein the ratio of unit (I) to unit (II) is greater than (I); said units (I) and (II) being attached to each other by an —O— bond, comprising reacting under substantially anhydrous condition bisphenol A, dichlorodiphenyl sulfone dihydroxydiphenyl sulfone, in an aprotic solvent in the presence of alkali metal carbonate, wherein the ratio of the concentration of OH groups to halo groups is from about 0.90 to about 1.10, and said bisphenol A comprises at least 10 mole percent of bisphenol A and dihydroxydiphenyl sulfone.

3. A process for the production of an amorphous thermoplastic polymer containing units of formula:

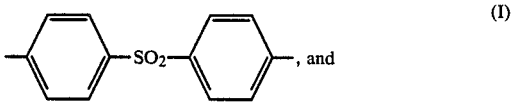

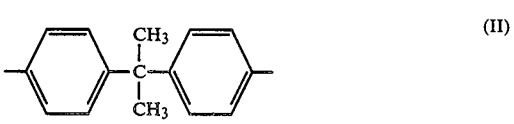

wherein the ratio of unit (I) to unit (II) is greater than (I); said units (I) and (II) being attached to each other by an —O— bond, comprising reacting under substantially anhydrous conditions bisphenol A, dichlorodiphenyl sulfone, dihydroxydiphenyl sulfone, in a solvent mixture comprising a solvent which forms an azeotrope with water and a polar aprotic solvent in the present of alkali metal carbonate, wherein the ratio of the concentration of OH groups to halo groups is from about 0.90 to about 1.10.

* * * * *

UNITED STATES PATENT OFFICE
CERTIFICATE OF CORRECTION

Patent No. 4,857,625                      Dated August 15, 1989

Inventor(s) R. Clendinning, L. Maresca, M. Matzner, T. Schwab

It is certified that error appears in the above-identified patent and that said Letters Patent is hereby corrected as shown below:

In Claim 1, the second line after the formulas, change "(I)" at its first appearance in the line to --1--.
In Claim 2, the second line after the formulas, change "(I)" at its first appearance in the line to --1--.
In Claim 3, the second line after the formulas, change "(I)" at its first appearance in the line to --1--.

Signed and Sealed this

Ninth Day of October, 1990

Attest:

HARRY F. MANBECK, JR.

*Attesting Officer*     *Commissioner of Patents and Trademarks*